Patented Mar. 6, 1951

2,543,767

UNITED STATES PATENT OFFICE 2,543,767

1-HYDROXY-4-POLYFLUOROALKYLAMINO-ANTHRAQUINONE COMPOUNDS

Joseph B. Dickey, Rochester, N. Y., assignor to Eastman Kodak Company, Rochester, N. Y., a corporation of New Jersey No Drawing. Application January 27, 1949, Serial No. 73,233

3 Claims. (Cl. 260—380)

This invention relates to new anthraquinone compounds and their application to the art of dyeing or coloring.

The four anthraquinone compounds 1-hydroxy - 4 - ($\beta,\beta$ - difluoropropylamino) - anthraquinone, 1 - hydroxy - 4 - ($\beta,\beta$-difluoroisopropylamino)-anthraquinone, 1-hydroxy-4-($\beta,\beta,\beta$-trifluoroisopropylamino)-anthraquinone and 1-hydroxy - 4 - ($\beta,\beta$ - difluorobutylamino) - anthraquinone are valuable dyes for coloring textile materials made of or containing a cellulose alkyl carboxylic acid ester having two to four carbon atoms in the acid groups thereof. They are particularly of use for the coloration of cellulose acetate textile materials.

It is an object of the invention to provide new anthraquinone dye compounds. Another object is to provide a satisfactory process for the preparation of the new anthraquinone dye compounds of the invention. A further object is to provide dyed cellulose alkyl carboxylic acid ester textile materials which possess very good or excellent fastness to light and gas. A particular object is to provide new anthraquinone compounds which are of especial value for the dyeing of cellulose acetate textile materials.

By cellulose alkyl carboxylic acid esters having two to four carbon atoms in the acid groups thereof, is meant to include, for example, both hydrolyzed and unhydrolyzed cellulose acetate, cellulose propionate, cellulose butyrate, cellulose acetate-propionate and cellulose acetate-butyrate. The new anthraquinone compounds color textile materials made of the aforesaid cellulose alkyl carboxylic acid esters reddish-violet shades.

The anthraquinone compounds above-mentioned are prepared by condensing leuco-quinizarin with $\beta,\beta$-difluoropropylamine, $\beta,\beta$-difluoroisopropylamine, $\beta,\beta,\beta$-trifluoroisopropylamine or $\beta,\beta$-difluorobutylamine. The condensation reaction is ordinarily effected by heating the reaction mixture under refluxing conditions until the reaction is complete. Ordinarily, a slight excess of the fluoroalkylamine compound over that theoretically required is employed. Normally the reaction is carried out in the presence of an inert diluent such as methyl alcohol, ethyl alcohol, isopropyl alcohol, n-butyl alcohol or n-amyl alcohol. Similarly, an acid-binding agent such as potassium acetate is usually present during the reaction.

The following examples illustrate the compounds of the invention and the manner in which they can be prepared.

Example 1

In a 100 cc. round-bottomed, 3-necked flask fitted with a condenser and a sealed stirrer were placed 2.42 grams of leucoquinizarin, 1.14 grams of $\beta,\beta$-difluoropropylamine ($H_2NCH_2CF_2CH_3$) and 40 cc. of n-butyl alcohol. The reactants were refluxed on the steam bath with stirring for 6–7 hours, the color changing from a pale yellowish-brown to a reddish violet. 5 cc. of water and 2.31 grams of $NaBO_3 \cdot 4H_2O$ were then added and the reaction mixture was heated with stirring at 90° C.–95° C. for 2 hours after which it was poured into 600 cc. of water. The precipitate which formed was recovered by filtration, washed with water and dried. The 1-hydroxy-4-$\beta,\beta$-difluoropropylamino-anthraquinone thus obtained was purified by twice crystallizing from ethyl alcohol. It has the formula:

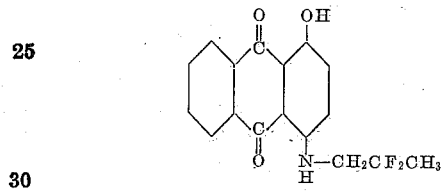

melts at 133° C.–138° C. and colors cellulose acetate bright reddish-violet shades which are very fast to gas and light.

Example 2

In a 100 cc. round-bottomed, 3-necked flask fitted with a condenser and a sealed stirrer were placed 7.26 grams of leuco-quinizarin, 3.6 grams of $\beta,\beta$-difluorobutylamine ($CH_3CH_2CF_2CH_2NH_2$) and 40 cc. of n-butyl alcohol. The reactants were refluxed on the steam bath with stirring for 6–7 hours, the color changing from a pale yellowish-brown to a reddish-violet. 10 cc. of water and 6.9 grams of $NaBO_3 \cdot 4H_2O$ were then added and the reaction mixture was heated with stirring at 90° C.–95° C. for 2 hours with stirring after which it was poured into 600 cc. of water. The dye compound formed was recovered by filtration, washed with water and dried. The 1 - hydroxy - 4 - $\beta,\beta$ - difluorobutylamino - anthraquinone is a red-brown powder which after crystallization from ethyl alcohol melts at 127° C.–129° C. It has the formula:

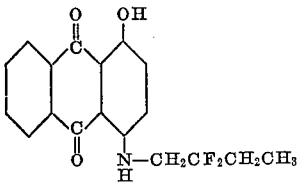

and colors cellulose acetate textile materials reddish-violet shades which have very good resistance to light and gas fading. The shades obtained with this dye are somewhat bluer than those obtained with the dye of Example 1.

Example 3

2.42 grams of leuco-quinizarin and 1.41 grams of $\beta,\beta,\beta$-trifluoroisopropylamine

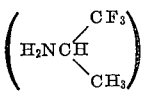

were placed in 20 cc. of n-butyl alcohol and sealed in a Carius tube. The tube was heated at 150° C. for 24 hours with shaking after which it was cooled and the contents removed. The tube was washed with 15 cc. of n-butyl alcohol. A blood-red solution was obtained which was combined with the contents first removed from the tube. The combined liquids were oxidized with 2.31 grams of $NaBO_3 \cdot 4H_2O$ at 90° C.–95° C. for 2–3 hours and then the resulting reaction mixture was poured into 400 cc. of water and the precipitate which formed was recovered by filtration, washed with water and dried. The 1-hydroxy-4-$\beta,\beta,\beta$-trifluoroisopropylamino-anthraquinone thus obtained as a reddish-brown solid was purified by recrystallization from 20 cc. of boiling xylene. The dye compound obtained has the formula:

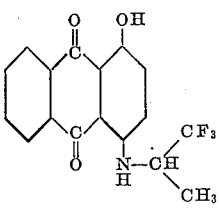

It melts at 143° C.–145° C. and colors cellulose acetate textile materials pink shades having excellent fastness to gas and light.

Example 4

7.26 grams of leuco-quinizarin, 3.14 grams of $\beta,\beta$-difluoroisopropylamine

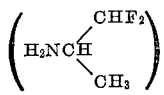

and 40 cc. of n-butyl alcohol were placed in a 100 cc. round-bottomed, 3-necked flask fitted with a condenser and a sealed stirrer. The reactants were refluxed on the steam bath with stirring for 6–7 hours, the color changing from a pale yellowish-brown to a reddish-violet. 10 cc. of water and 6.9 grams of $NaBO_3 \cdot 4H_2O$ were then added and the reaction mixture was heated with stirring at 90° C.–95° C. for 2 hours with stirring after which it was poured into 600 cc. of water. The dye compound formed was recovered by filtration, washed with water and dried. The 1-hydroxy-4-$\beta,\beta$-difluoroisopropylamino-anthraquinone thus obtained is a red-brown powder, which, upon crystallization from ethyl alcohol, melts at 130° C.–133° C. It has the formula:

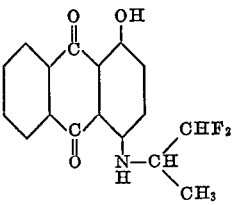

and colors cellulose acetate textile materials bright red-violet shades which have very good fastness to light and gas.

The dye compounds of the invention are soluble in most organic solvents. They are soluble, for example, in methyl alcohol, ethyl alcohol, n-propyl alcohol, isopropyl alcohol, n-butyl alcohol, benzene, toluene, xylene, pyridine and acetic acid.

In order that the preparation of the anthraquinone compounds of the invention may be entirely clear, the preparation of certain intermediates used in their manufacture is described hereinafter.

Preparation of $\beta,\beta$-difluoropropylamine 48 grams of $CH_3CF_2CH_2Br$, J. A. C. S., vol. 59, page 2434 (1937), are heated with 200 cc. of 28% aqueous ammonia and 1 gram of a wetting agent such as Nacconol NR (sodium alkyl naphthalene sulfonate) in a shaking autoclave at 130° C.–150° C. for 24 hours. The reaction mixture is then carefully distilled through an efficient fractionating column, $NH_3$ gas coming off first. The amine fraction distilling over from 60° C.–85° C. is then collected and dried over solid NaOH and then finally redistilled from fresh solid NaOH. $\beta,\beta$-Difluoropropylamine distils over at 75° C.–77° C. and has a refractive index of $N_D^{25} 1.3622$. It is a water-white liquid miscible with water and with other ordinary organic solvents and has a characteristic amine odor.

Preparation of $\beta,\beta,\beta$-trifluoroisopropylamine 1,1,1-trifluoroacetone was heated in an autoclave at 90° C.–100° C. for 5 hours with a water solution of hydroxylamine hydrochloride and sodium acetate to form the oxime. The process is substantially the same as that employed by Swarts, Bull. sci. acad. roy. Belg., No. 4, page 178 (1927).

25 grams of the oxime reaction product obtained as just described was hydrogenated in ethyl ether in an autoclave under 2000 pounds hydrogen pressure using Raney nickel as a catalyst. Upon completion of the hydrogenation reaction the ether solution was filtered and the filtrate was acidified with ethereal hydrogen chloride to obtain $\beta,\beta,\beta$-trifluoroisopropylamine in its hydrochloride form, which was recrystallized from its solution in ethyl alcohol-ethyl ether.

Calculated for $C_3H_7ClF_3N$: C, 24.4; H, 4.7; N, 9.4. Found: C, 24.3; H, 4.6; N, 9.3.

The free amine was obtained from the amine hydrochloride by treating with an aqueous 50% KOH solution and distilling off the amine. It boils at 46° C.–47° C. at 760 mm. and has a refractive index of $N_D^{20} 1.3210$.

$\beta,\beta,\beta$-Trifluoroisopropylamine can also be prepared by reacting $CF_3CHBrCH_3$ with concentrated aqueous ammonia in an autoclave.

Preparation of β,β-difluoroisopropylamine

This compound is prepared in accordance with the procedure described in connection with β,β,β-trifluoroisopropylamine. That is, difluoroacetone, $CHF_2COCH_3$, is converted to the oxime by treatment with a water solution of hydroxylamine hydrochloride and sodium acetate and the oxime is converted to β,β-difluoroisopropylamine (B. P. 80° C.–82° C.) in accordance with the procedure used in the case of β,β,β-trifluoroisopropylamine.

β,β-Difluoroisopropylamine can also be prepared by reacting $CHF_2CHBrCH_3$ with concentrated aqueous ammonia in an autoclave.

Preparation of β,β-difluorobutylamine 52 grams of 1-bromo-2,2-difluoro-n-butane ($CH_3CH_2CF_2CH_2Br$) are heated with 200 cc. of 28% aqueous ammonia and 1 gram of a wetting agent such as Nacconol NR (sodium alkyl naphthalene sulfonate) in a shaking autoclave at 135° C.–150° C. for 24 hours. The reaction mixture is then carefully distilled through an efficient fractionating column, $NH_3$ gas coming off first. The amine fraction distilling over from 85° C.–110° C. is then collected and dried over solid NaOH and then finally redistilled from fresh solid NaOH. β,β-Difluorobutylamine distils over at 100° C.–102° C. It is a water-white liquid miscible with water and with other ordinary organic solvents and has a characteristic amine odor.

β,β-Difluorobutylamine can also be prepared by using 39 grams of 1-chloro-2,2-difluoro-n-butane (a known compound) in place of 1-bromo-2,2-difluoro-n-butane in the foregoing reaction. However, in this latter case a reaction temperature of 170° C.–185° C. should be employed instead of 135° C.–150° C.

Preparation of 1-bromo-2,2-difluoro-n-butane 250 grams of 1,2-dibromo-2-chloro-n-butane ($CH_3CH_2CClBrCH_2Br$) and 262 grams of anhydrous $HgF_2$ were placed in a 500 cc. round-bottomed flask cooled in an ice bath. The flask was fitted with a still head and a water cooled receiver. The ice bath was removed and the reactants heated up spontaneously. Following this exothermic reaction the reaction mixture was heated by means of a flame. The desired reaction product, 1-bromo-2,2-difluoro-n-butane, began distilling over at 95° C. Heating by a moving flame was continued until 120 grams of crude product distilled over from 95° C.–180° C. The 120 grams of crude product thus obtained was dried over $CaCl_2$ and fractionated, to yield 90 grams (52%) of $CH_3CH_2CF_2CH_2Br$ boiling at 103° C.–104° C.

Preparation of 1,2-dibromo-2-chloro-n-butane

To a 1-liter 3-necked flask fitted with a stirrer and cooled to 10° C. was added 181 grams of 2-chloro-1-butene. Over a period of about 1 hour 320 grams of bromine was added dropwise so that only addition took place. The reaction product thus obtained was washed with an aqueous sodium bisulfite solution and then water after which it was dried over calcium chloride. Fractionation under reduced pressure yielded 390 grams (79%) of $CH_3CH_2CClBrCH_2Br$ boiling at 90° C–93° C.

The anthraquinone dye compounds of the invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds selected from the group consisting of 1-hydroxy-4-(β,β-difluoropropylamino)-anthraquinone and 1-hydroxy-4-(β,β,β-trifluoroisopropylamino)-anthraquinone.

2. The anthraquinone compound having the formula:

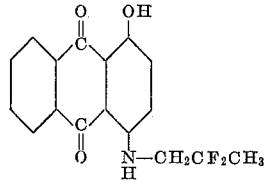

3. The anthraquinone compound having the formula:

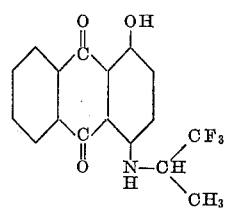

JOSEPH B. DICKEY.

REFERENCES CITED

The following references are of record in the file of this patent:

UNITED STATES PATENTS

| Number | Name | Date |
| --- | --- | --- |
| 2,112,258 | Wilder | Mar. 29, 1938 |
| 2,466,009 | Dickey | Apr. 5, 1949 |